(No Model.)
J. G. GAY.
TWO WHEELED VEHICLE.
No. 272,678. Patented Feb. 20, 1883.
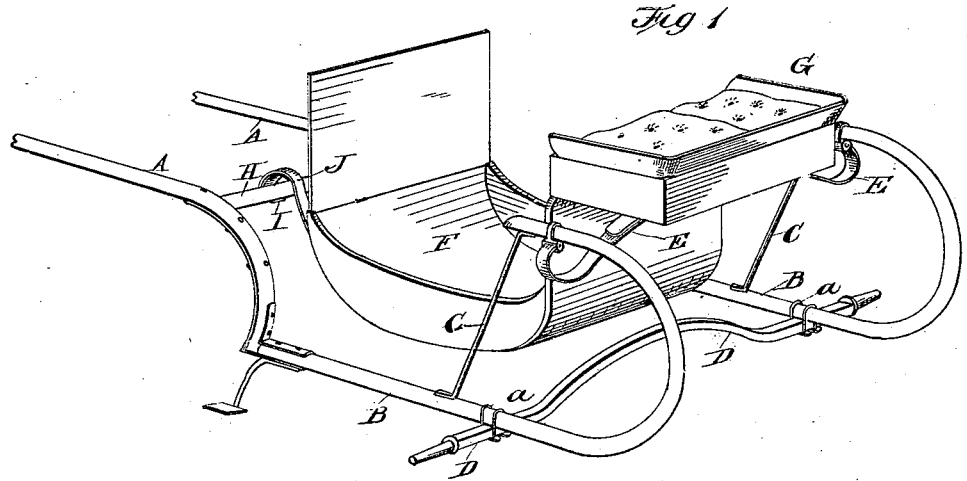
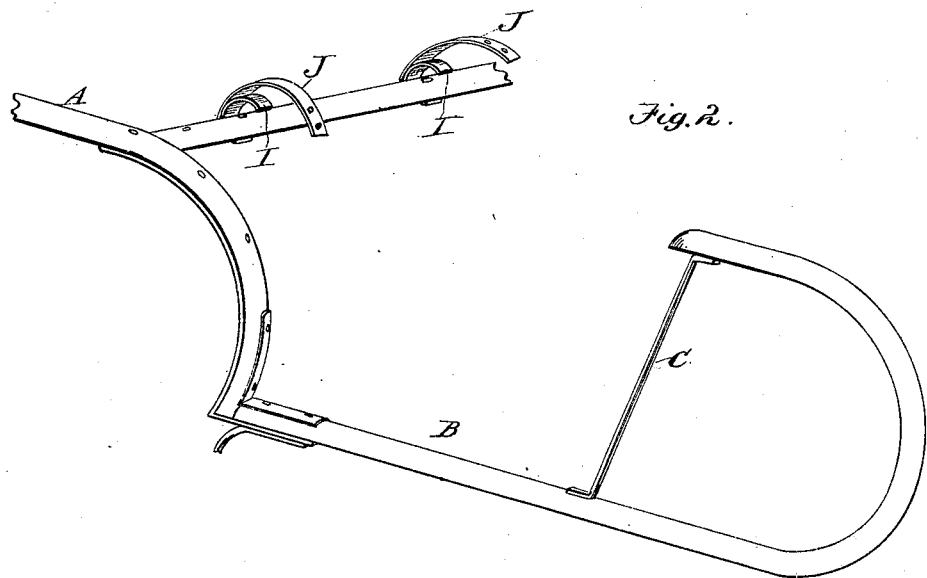
WITNESSES:
W. H. Knight
Fred P. Church
INVENTOR
Joshua G. Gay
per H. A. Abbot
Attorney

UNITED STATES PATENT OFFICE.

JOSHUA G. GAY, OF OTTAWA, ILLINOIS.

TWO-WHEELED VEHICLE.

SPECIFICATION forming part of Letters Patent No. 272,678, dated February 20, 1883.

Application filed September 30, 1882. (No model.)

*To all whom it may concern:*

Be it known that I, JOSHUA G. GAY, a citizen of the United States of America, residing at Ottawa, in the county of La Salle and State of Illinois, have invented certain new and useful Improvements in Two-Wheel Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is a perspective view of the vehicle; Fig. 2, detail of portion of my invention, showing springs, arrangement of shaft, &c.

This invention relates to improvements in two-wheel shaft-vehicles—such as sulkies, trotting-carts, &c.; and it consists in certain novel devices and the arrangement of the various parts, which will be more fully described and set forth in the specification and claim.

Similar letters of reference denote like parts.

Referring to the drawings, A A represent the shafts, curved downward at the rear end and attached rigidly to the side bars, B B, said side bars being curved upward at their rear end in a C-curve, and their extreme ends extending horizontally toward the front, and being fastened to the axle by clips at the point *a*, just forward of the lower portion of the curve in said side bars.

C C are metal braces, fastened at one end to the upper end of the curved side bars and at the other end to the lower portion of the said bars, just forward of the axle D.

E is a spring fastened at each end to the upper portion of the side bars, B B, upon the center of which spring E, and fastened to it, rests the seat G, said spring forming the rear support for the body of the vehicle.

F is the body, and G the seat; H, the cross-bar connecting the shafts A A, placed just at the upper end of the curve in said shafts.

I I are curved C-springs, having one end attached to the cross-bar H and the other end free.

J J are leather straps, fastened at one end immediately under the springs I I to the cross-bar H, and extending up directly over said curved springs I I, and having the other end fastened to the front of the body F, said straps forming the forward support for the body F.

The seat G is placed so that the greater portion of said seat is to the rear of the axle, thus balancing the weight of the driver over the axle.

The advantages of my invention are: by the arrangement of the seat and springs to balance the weight of the driver over the axle and do away with the unpleasant jolt generally experienced in vehicles of this class, and by having the shafts forward of the body to make it much easier to get in and out of than in ordinary two-wheel shaft-vehicles.

Having thus fully described my invention, I claim—

In a two-wheel vehicle, the combination of the shafts A, curved downward at their rear ends, the cross-bar H, side bars, B, attached to the ends of the shafts and curved upward at their rear ends, the axle D, braces C, spring E, attached to the side bars, B, springs I, and straps J, attached to the cross-bar H, body F, and seat G, supported by spring E and straps J, substantially as and for the purpose shown and described.

In testimony whereof I affix my signature in presence of two witnesses.

JOSHUA G. GAY.

Witnesses:
J. SAMPLE,
JAMES MCMANUS.